US006680572B1

(12) United States Patent
Morel

(10) Patent No.: US 6,680,572 B1
(45) Date of Patent: Jan. 20, 2004

(54) INCANDESCENT LAMP COMPRISING A GLASS BULB OF TUBULAR SHAPE IN WHICH A FILAMENT IS AXIALLY ARRANGED

(75) Inventor: Michel Morel, Plappeville (FR)

(73) Assignee: Koninklijke Philips Electronics N.V., Eindhoven (NL)

(*) Notice: Subject to any disclaimer, the term of this patent is extended or adjusted under 35 U.S.C. 154(b) by 253 days.

(21) Appl. No.: 09/603,929

(22) Filed: Jun. 27, 2000

(30) Foreign Application Priority Data

Jun. 28, 1999 (FR) .......................................... 99 08236

(51) Int. Cl.[7] ........................... A01J 61/30; A01J 63/02

(52) U.S. Cl. ...................... 313/574; 313/623; 313/634; 313/578; 313/271; 313/274

(58) Field of Search ............................... 313/574, 623, 313/274, 634, 271, 578

(56) References Cited

U.S. PATENT DOCUMENTS 5,140,217 A * 8/1992 Rao et al. ................. 140/71.6
5,254,902 A * 10/1993 Griffin et al. ............... 313/271
5,349,265 A * 9/1994 Lemelson ................... 313/345
5,404,069 A * 4/1995 Olwert et al. ............... 313/271
5,896,004 A * 4/1999 Feldman et al. .............. 313/17
6,291,934 B1 * 9/2001 Berger et al. ............... 313/274
6,307,320 B1 * 10/2001 Fuse et al. .................. 313/331
6,359,376 B1 * 3/2002 Hollstein et al. ............ 313/46

FOREIGN PATENT DOCUMENTS

FR 2454180 4/1980 ........... H01K/1/24

* cited by examiner

*Primary Examiner*—Ashok Patel
*Assistant Examiner*—Sikha Roy
(74) *Attorney, Agent, or Firm*—Frank Keegan

(57) ABSTRACT

An incandescent lamp comprising a glass bulb (3) of tubular shape in which a filament (4) is axially arranged. The end is hermetically sealed by means of a pinch (5) applied around a metal foil (1) to which an outer current lead (7) and an inner current lead (6) electrically connected to the filament are fixed. A second, intermediate flat foil (2) is connected directly to the end (9) of the filament, between the latter and the inner current lead (6), and the bulb is elbowed at the level of said second flat foil (2).

9 Claims, 1 Drawing Sheet

INCANDESCENT LAMP COMPRISING A GLASS BULB OF TUBULAR SHAPE IN WHICH A FILAMENT IS AXIALLY ARRANGED

BACKGROUND OF THE INVENTION

The invention relates to an incandescent lamp comprising a bulb of tubular shape in which a filament is axially arranged, each end of said bulb being hermetically sealed by means of a pinch which is provided around a metal foil to which an outer current lead and an inner current lead electrically connected to the filament are fixed.

Such a lamp is used inter alia for cooking food in so-called "vitroceramic" cooking ranges, or for industrial heating applications.

A lamp as described in the opening paragraph is known from patent application FR 2 454 180.

SUMMARY OF THE INVENTION

It is an object of the invention to render possible a bent shape of the bulb without encountering problems with the alignment of the filament in the bulb in the course of lamp life.

To achieve this, a second, intermediate flat foil is connected directly to the end of the filament, between the latter and the inner current lead, and the bulb is elbowed at the level of said second flat foil.

Special embodiments of the invention will become apparent from the dependent claims 2 and 3.

These as well other, more detailed aspects of the invention will be clarified in the following description of an embodiment, which forms a non-limitative example.

DETAILED DESCRIPTION OF THE PREFERRED EMBODIMENT

Figure 1:
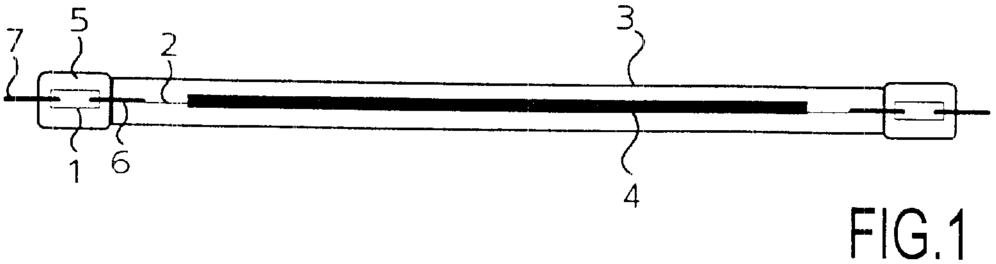
FIG. 1 shows a lamp according to the invention, before the bulb has been elbowed.

In FIG. 1, a lamp comprises, in known manner, a glass bulb 3 of tubular shape, for example of quartz glass in the case of a halogen lamp, in which a filament 4 is axially arranged, while each end of the bulb is hermetically sealed by means of a glass pinch 5 provided around a metal foil 1 to which an outer current lead 7 and an inner current lead 6 electrically connected to the filament 4 are fixed. The pinch 5 is heat-sealed to the tube of the bulb 3. A second, intermediate flat foil 2 is directly connected to the end of the filament, between the latter and the inner current lead.

Figure 2:
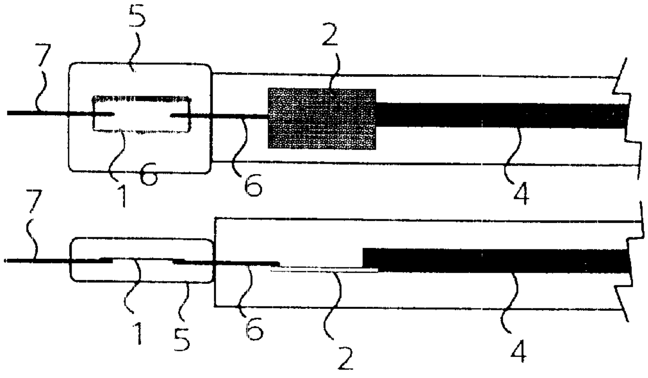
FIG. 2 shows the end of the lamp of FIG. 1, viewed from above and from the side.

In FIG. 2, the second, intermediate flat foil 2 lies in a plane parallel to that of the foil 1, whereas in the lamp of FIG. 1 the second, intermediate flat foil 2 and the foil 1 are in two mutually perpendicular planes: either of these situations may be used. The dimensions of the second flat foil are dependent on the electric current strength to be passed, a typical length would be 8 mm, a typical width 4 mm, and a typical thickness 0.05 mm.

Figure 3:
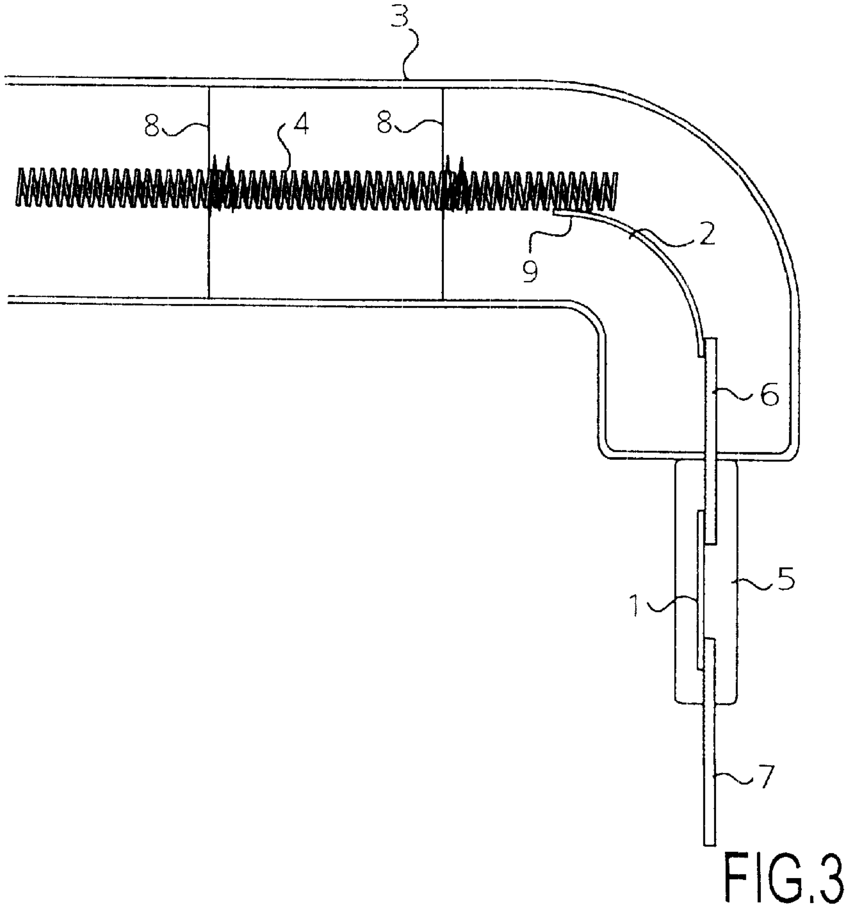
FIG. 3 shows the end of the finished lamp in more detail.

The bulb of the lamp of FIG. 3 is elbowed at each end, through heating, at the level of the second foil 2, which in itself is thin enough for curving itself while the tube of the bulb is being bent. The outer current lead 7 is thus brought into a direction perpendicular to the main axis of the lamp, which may be desirable in certain applications.

The filament 4, of the spiraled type, is here welded by one of its turns to the second, intermediate flat foil 2 at point 9. It is kept in place at regular intervals over its entire length by known supports 8. Alternatively, for example, one of the turns of the filament may be soldered to the second intermediate flat foil 2.

Generally, though not necessarily, the lamp comprises a second intermediate flat foil and a fold at each end.

It will be obvious that the verb "comprise" does not exclude the presence of other elements or steps besides those listed in any claim.

What is claimed is:

1. An incandescent lamp comprising a bulb of tubular shape in which a filament is axially arranged, each end of said bulb being hermetically sealed by means of a pinch which is provided around a metal foil to which an outer current lead, and an inner current lead electrically connected to the filament are fixed, wherein a second flat foil is connected directly to the end of the filament, between the filament and one of the inner current leads, the bulb being elbowed at the level of said second flat foil.

2. An incandescent lamp as claimed in claim 1, wherein said second flat foil has an elbow bend.

3. An incandescent lamp as claimed in claim 1, wherein the filament is spiraled having turns and there is a soldered connection between one of the turns and the second flat foil.

4. An incandescent lamp comprising:

a bulb of tubular shape;

a wall of said bulb enclosing a tubular space;

a filament axially arranged in said tubular space;

a first outer current lead connected at a first connection to a first inner current lead;

a second outer current lead connected at a second connection to a second inner current lead;

a first end of said bulb being hermetically sealed by a pinch provided around the first connection;

a second end of said bulb being hermetically sealed by a pinch provided around the second connection;

the first inner current lead being connected to an intermediate flat foil, arranged in said tubular space, said intermediate flat foil being connected to a first end of said filament; and a second end of said filament being connected at a second intermediate connection, arranged in said tubular space, to the second inner current lead.

5. An incandescent lamp as claimed in claim 4, wherein the bulb is elbowable by heating the wall opposite said intermediate flat foil.

6. An incandescent lamp as claimed in claim 4, wherein the first connection comprises a first metal foil.

7. An incandescent lamp as claimed in claim 6, wherein the second intermediate connection comprises a second intermediate flat foil, the second connection comprises a second metal foil and the bulb is elbowable by heating the wall opposite said second intermediate flat foil.

8. An incandescent lamp comprising a bulb of tubular shape in which a filament is axially arranged, each end of said bulb being hermetically sealed by means of a pinch which is provided around a metal foil to which an outer current lead and an inner current lead electrically connected to the filament are fixed, the inner current leads comprising a portion outside said pinch, a second flat foil being connected to the end of the filament, between the filament and one of said portions of the inner current lead.

9. An incandescent lamp as claimed in claim 8, wherein the bulb is elbowed at said second flat foil.

* * * * *